Nov. 1, 1927.  N. TRBOJEVICH  1,647,157

SPIRAL BEVEL GEARING

Filed Jan. 7, 1924  7 Sheets-Sheet 1

Inventor
Nikola Trbojevich

By Whittemore, Hulbert & Whittemore Belknap
Attorneys

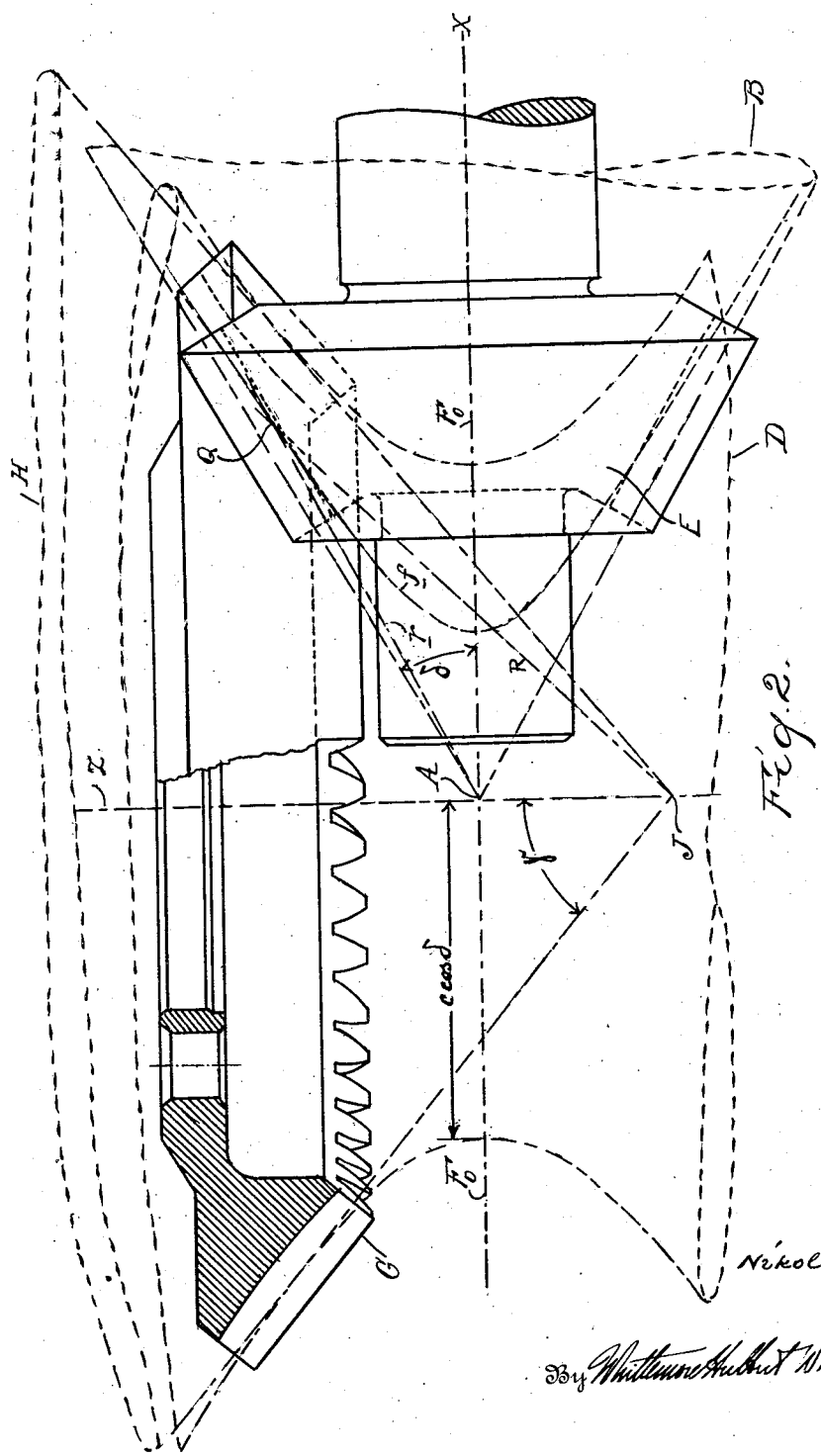

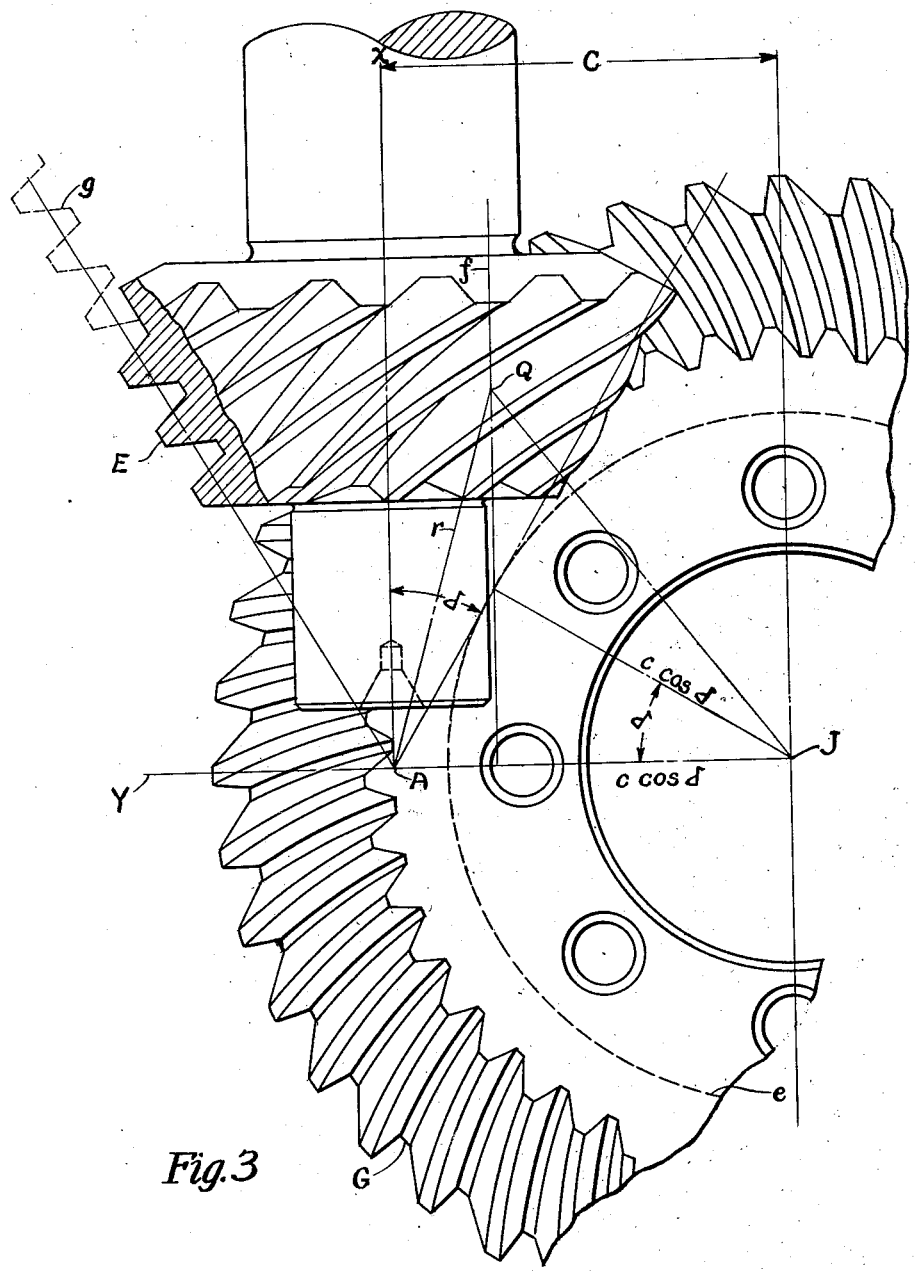

Nov. 1, 1927.  
N. TRBOJEVICH  
1,647,157  
SPIRAL BEVEL GEARING  
Filed Jan. 7. 1924  
7 Sheets-Sheet 4

Inventor  
Nikola Trbojevich

Inventor
Nikola Trbojevich

Nov. 1, 1927.

N. TRBOJEVICH

SPIRAL BEVEL GEARING

Filed Jan. 7, 1924

Inventor
Nikola Trbojevich

By

Attorneys

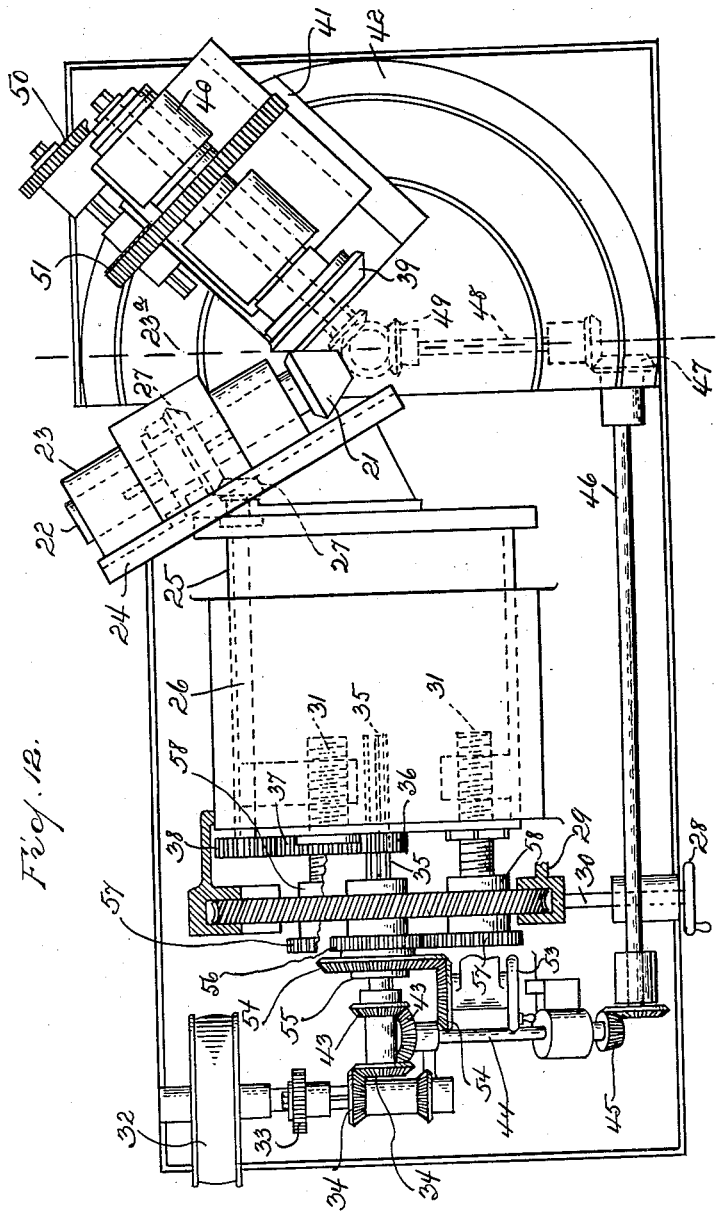

Patented Nov. 1, 1927.

1,647,157

UNITED STATES PATENT OFFICE.

NIKOLA TRBOJEVICH, OF DETROIT, MICHIGAN, ASSIGNOR TO GLEASON WORKS, OF ROCHESTER, NEW YORK, A CORPORATION OF NEW YORK.

SPIRAL BEVEL GEARING.

Application filed January 7, 1924. Serial No. 684,862.

The invention relates to spiral bevel gearing of the modified involute type and more particularly to a specific form which may be designated as hyperboloidal worm gearing since it consists essentially of a tapered worm meshing with a conjugate hyperboloidal worm wheel. Both the worm and the worm wheel can be manufactured by the hobbing process since the longitudinal tooth contours in each are curves of the modified involute type, such as described in my United States Patents 1,465,149, 1,465,150, and 1,465,151, issued August 14, 1923. These former patents describe some of the basic principles underlying the gearing described herein and may be referred to for further information regarding the modified involute curve but this application deals only with a specific construction in which the drive member is a tapered worm of the modified involute type (preferably the Archimedean spiral type) and the driven member is a conjugate hyperboloidal wheel having spiral teeth, the two gears being arranged at right angles and situated in two different planes.

The new worm drive offers some remarkable practical advantages over the well known spur worm drive. Thus, the backlash between the worm and gear may be adjusted without changing the center distance, owing to the tapered form of the driving worm. The contact between the two pitch surfaces is always a line contact (an arc of a hyperbola) and extends over the entire faces of the worm and gear, while in the conventional form, the pitch contact is limited to the central plane only. From this it follows that the new gears have a greater area of contact and are stronger than the conventional gears of similar size. Another very important advantage is the reversibility of the drive in connection with what is usually termed as "coasting". The new worm thread is non-symmetrical (concave on one side and convex on the other) resulting in the curious phenomenon that such drives may be designed that will freely coast when the worm gear is driving in one direction, but will be self-locking when the worm gear tends to drive in the opposite direction. When this feature is applied to final drives of automobiles and trucks, such vehicles may now be made to freely coast forwards, and be automatically prevented from coasting backwards. The same feature is also valuable in elevators, cranes, etc. Other minor advantages are that the lubricating oil film holds up better on account of a more evenly distributed surface pressure; the worms may be machined and ground more accurately because the diameters do not need to be exact owing to the tapered form. The center distance also is less than for a similar spur worm drive. Two kinds of contact are obtainable, the "high-sliding" type (the extended involute form) and the "low-sliding" type (the abridged form), while in spur worm gearing as heretofore known, only the high-sliding type existed.

In the drawings:—

Figure 2 is a side elevation of the new worm drive of the abridged involute type;

Figure 3 is a plan view of the drive shown in Figure 2;

Figure 12 is a diagrammatic plan view of a hobbing machine suitable for generating of the new worm gears.

In order to understand the principle of operation of this new kind of gearing, it is necessary first to consider certain mathematical and kinematical peculiarities upon which the system is founded.

Figure 1:
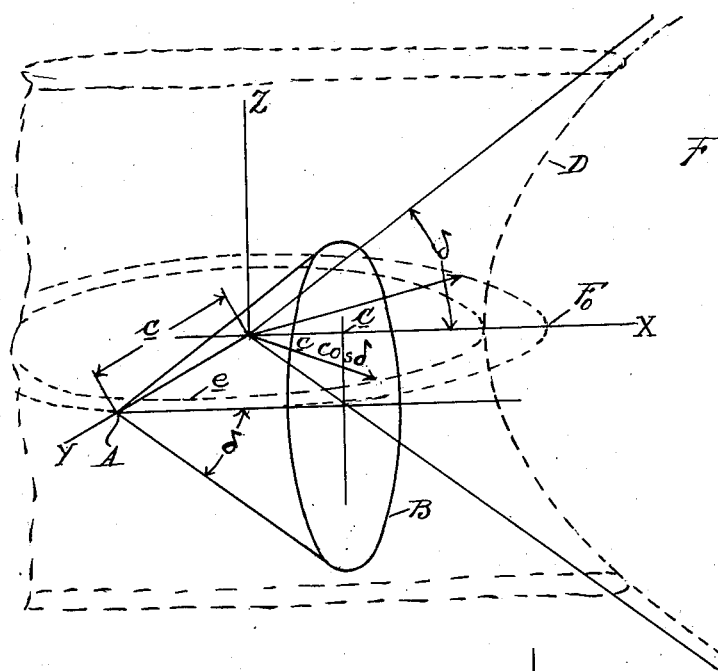
Figures 1, 4, 5, 6 and 7 are geometrical diagrams explaining the theory of the new drive.

If a cone B having a cone angle $\delta$ is placed so with respect to an orthogonal system of coordinates XYZ (Figure 1) that its axis lies in the $xy$ plane at a distance $c$ from the Z axis, and its apex A is also at the same distance $c$ from said axis; and if the cone is rotated about that axis Z, then the cone B will envelop a hyperboloid of revolution of one sheet D the mathematical equation of which is:

$$\frac{x^2 + y^2}{c^2 \cos^2 \delta} - \frac{z^2}{c^2 \sin^2 \delta} = 1 \quad (1)$$

An analysis of the equation (1) discloses the following facts: First, the angle of obliquity of the generated hyperboloid is equal to the cone angle $\delta$ of the cone B; second, the apex of the cone lies in the focus $F_0$ of the meridian hyperbola of said hyperboloid, and third the cone B always touches the generated hyperboloid along a plane curve, in particular, along a hyperbola, the equation of which in a plane parallel to the $xz$ plane is:

$$\frac{x^2}{c^2 \sin^2 \delta \cos^2 \delta} - \frac{z^2}{c^2 \sin^4 \delta} = 1 \quad (2)$$
$$y = c \cos^2 \delta$$

The hyperbola defined by the equations (2) is what is termed in mathematics the characteristic of the system, that is, it lies both on the cone B and on the generated hyperboloid, at the same time. The angle of obliquity of said hyperbola is also equal to the cone angle $\delta$, while its transverse and conjugate half axes are $c \sin \delta \cos \delta$ and $c \sin^2 \delta$ respectively.

It is now evident that it might be possible (theoretically) to construct a pair of mating gears, the pitch surfaces of which are a cone and a hyperboloid respectively. In that case the contact between the two is always along a line (the characteristic hyperbola) and the axes are arranged at right angles and non-intersecting. Further, the contact is of the sliding type, similar to that found in common or spur worm gearing.

Thus, practicable gears could be constructed operating according to this principle provided suitable longitudinal curves can be found that will correctly mesh together when wrapped upon their conical and hyperboloidal respective pitch surfaces, and if, further, means can be found for correctly forming or generating the conjugate transverse contours of the teeth.

I have discovered that if the driving worm is a tapered screw of the modified involute type, that is, if its threads are generated by a straight rack element of constant pitch rolling in an acute angular relation across the longitudinal tooth curves, a theoretically correct engagement is obtainable. In that case the longitudinal tooth curves of the mating hyperboloidal gear will also be of the modified involute character, and its teeth will have the unique property for this type of gear of correctly meshing crosswise with a rack element.

The method of calculating the conjugate modified involutes will now be described. In Figures 2 and 3 two views of a hyperboloidal worm drive of the abridged involute type are shown. The tapered worm E has a cone angle $\delta$, preferably 30 deg. and a constant lead, that is, its axial sections are the straight rack elements $g$. The hyperboloidal wheel G is placed relatively to the worm E in such a manner that its axis is perpendicular to the axis of the worm, and the shortest distance between said two axes is equal to $c$. It can be proved mathematically from the equations (1) and (2) that the gorge circle $e$ of the pitch hyperboloid D has a radius equal to $c \cos \delta$, while the distance of the characteristic hyperbola $f$ measured from the axis of the gear G is equal to $c \cos^2 \delta$; and to $c \sin^2 \delta$ when measured from the axis of the worm E, Fig. 3.

Now when both the worm and the gear are rotated at the proper ratio the longitudinal spirals of the worm will engage the corresponding spirals of the gear, and will slide lengthwise along the latter. In order to study the nature of contact which takes place between said two elements, we first assume a point Q lying on the characteristic hyperbola $f$, and investigate the conditions in the neighborhood of that point. As the hyperboloid D is not developable into a plane, and in order to represent the neighborhood of the point Q upon a developable surface, we draw a tangent cone H, touching said hyperboloid internally at Q and having its apex at J, on the axis of the gear. Thus, the geometrical configuration is of the following form. There is a hyperboloid D and a point Q lying on it. The cones B and H are both tangent to said hyperboloid at Q, the former touching it externally along the hyperbola $f$, and the latter internally along a circle in a plane perpendicular to the Z axis. Therefore, the plane Q A J, tangent to the hyperboloid at Q, is also tangent to both cones, furthermore it also contains the two cone apexes A and J. It can be proved mathematically that no matter where the point Q is assumed along the characteristic hyperbola $f$, the triangle Q A J is always a right triangle, the right angle being at A.

The existence of this geometrical peculiarity (which to my knowledge I am the first to discover) enables us to construct proper longitudinal curves on the face of the hyperboloid D. Because, the triangle Q A J, consists of three sides, first of which (QA) is the pitch cone radius $r$ of the outer cone B, the second side (QJ) is the pitch cone radius R of the inner cone H, which cone is identical with the hyperboloid along a narrow circular strip passing through Q, and the third (AJ) is the apex distance C of the two cones, measured in the common tangent plane. Further, $r$ is perpendicular to C. On the other hand the section of the worm E along any pitch cone radius is the rack element $g$ as already stated. I have shown in my Patent #1,465,149 that in a case like this, viz, when the rack element is perpendicular to the apex distance and the longitudinal tooth curves of the worm are Archimedean spirals the equation of which is $$r = \pm \rho \phi_1 \quad (3)$$

where $\rho$ is the polar subnormal or the modification of the spiral, and $\phi_1$ is the vectorial angle; the longitudinal curves of the mating bevel gear must be modified involutes defined by the equation $$x = (a+p) \cos \phi_2 + a\phi_2 \sin \phi_2$$
$$y = (a+p) \sin \phi_2 - a\phi_2 \cos \phi_2 \quad (4)$$

where $a$ is the base radius, and $\phi_2$ the parametric angle. The relation also exists:

$$\rho \phi_1 = \pm a \phi_2 \quad (5)$$

As explained in my former patents referred to, the modified involute is a curve odontically conjugate to an Archimedean spiral (that is, if two spur gears were constructed the tooth curves of which were Archimedean spirals and modified involutes respectively, they would correctly mesh), and is geometrically defined as the tangential curve of a common involute of circle. Thus, if we draw a series of tangents to an involute and measure off a constant distance $p$ outwardly upon each of said tangents from their respective points of tangency with the parent curves, the locus obtained is an extended involute, while if the said constant distance $p$ (or the modification) is laid off inwardly, the result is an abridged involute. The Archimedean spiral itself is nothing but a special case of the abridged involute when the amount of the inward or negative modification is exactly equal to the base radius of the parent involute.

Two series of modified involutes will generally correctly mesh together with a combination of rolling and sliding motion if both are generated by the same rack element (having the same pitch and pressure angle) and if they possess the same amount of modification in absolute value. Thus an Archimedean spiral or a tapered worm of constant pitch being an abridged involute having a negative modification equal to its polar subnormal, the exact value of which is $$p = \frac{\text{lead of spiral}}{2\pi} \quad (6)$$

will correctly mesh with extended involutes having $(+p)$ modification or with abridged involutes having $(-p)$ modification. In the former case the hands of the worm and the worm gear are the same, both being either right hand or left hand, while in the abridged combination the hand of the worm is opposite to that of the gear. Therefore, two types of the hyperboloidal gearing may be constructed, respectively designated as the extended and the abridged involute types, both of which are capable of correctly meshing with a conical screw of constant pitch, although the nature of contact is fundamentally different in each case. In the extended combination (when both the worm and the gear have the same hand of helix) the nature of engagement is similar to that found in common or spur worm gearing, that is, there is considerable lengthwise sliding between two engaging helixes, and said helixes approach the common tangent plane from opposite directions. In the abridged type there is comparatively less sliding, because the meshing helixes approach the tangent plane from substantially the same direction and at different rates of velocity. This feature is unique in worm gearing because no worm gears as heretofore constructed were able to operate with as little sliding as the new abridged involute type worm gears.

Figure 4:
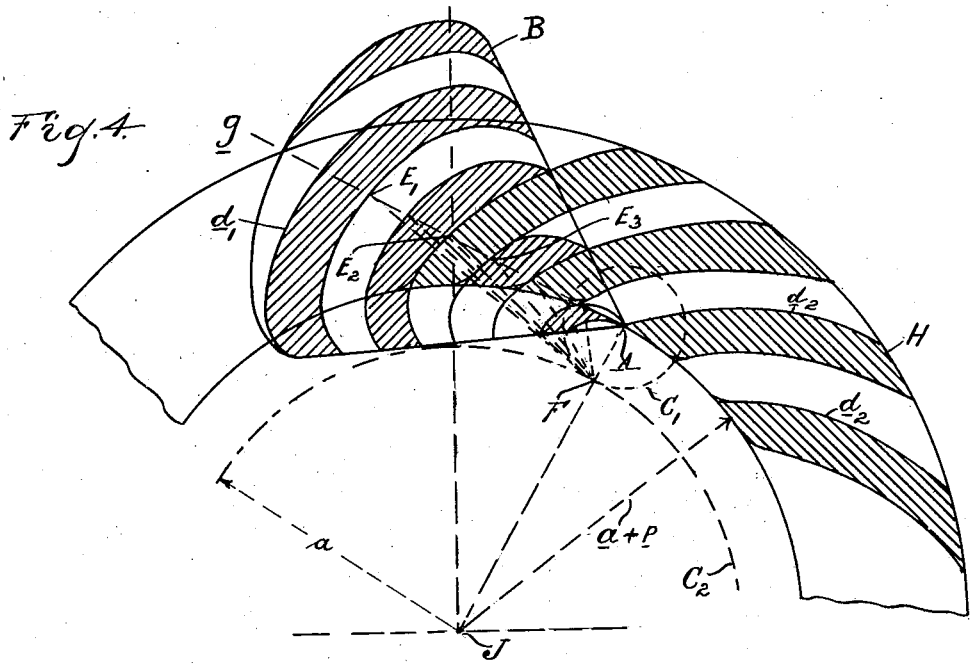
Figure 5:
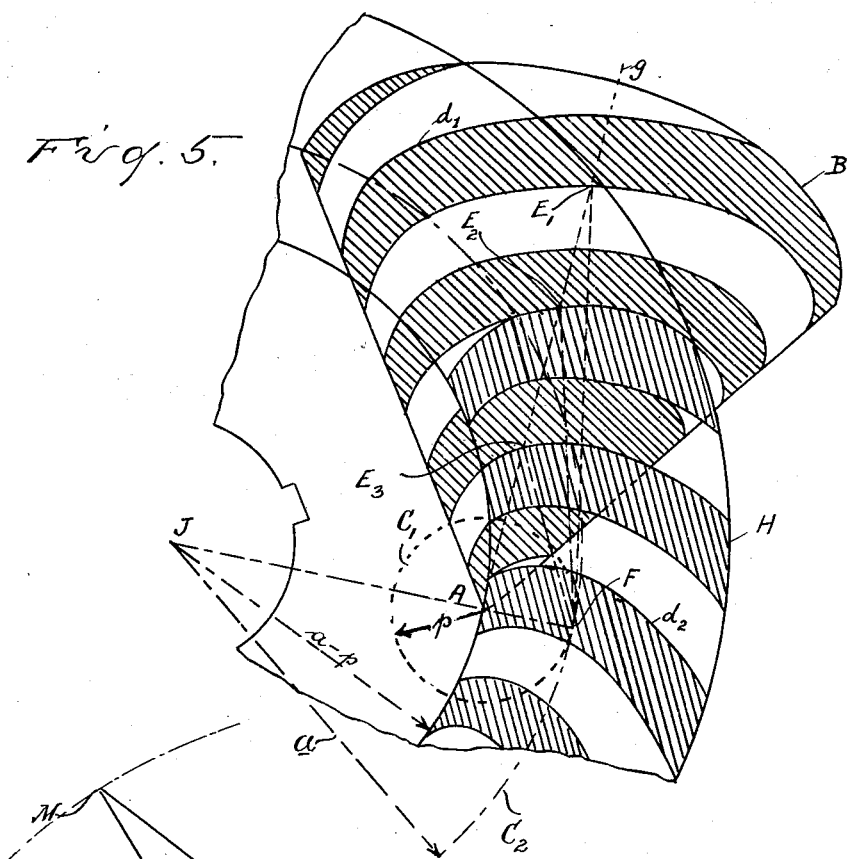

The dual nature of engagement obtainable in this new type of worm gearing is illustrated in Figs. 4 and 5, the former representing the extended and the latter the abridged type. In Fig. 4 the plane development (developed in the Q A J plane) of the inner tangent cone H is correctly superposed upon the pitch cone B of the tapered worm E in a tangential relation, this relation being determined by the kinematical conditions of the mutual conjugacy. That is, the acting rack generator $AQ = q$ is at a distance $(a+p)$ from the gear apex J and the apex A of the worm lies on the circumference of the $(a+p)$ circle. The distance $(a+p)$ equals the inside radius of the teeth of the gear H. Now, when the worm and the development of the cone are rotated at the proper ratio, their corresponding base circles $C_1$ and $C_2$ will roll together like two toothed wheels, and the portions of the worm thread $d_1$ in the neighborhood of the points $E_1$ $E_2$ $E_3$ along the rack generator $g$ will envelop the extended involutes $d_2$ in their full length. The lines $E_1$ F; $E_2$ F etc. are common normals to both systems of curves, and all pass through the same point F, the point of the tangency of the two base circles $C_1$ and $C_2$. The conjugate spirals $d_1$ and $d_2$ approach the tangent plane from two opposite directions, as indicated by the arrows, this fact directly following from the peculiarity that the base circles $C_1$ and $C_2$ touch each other externally.

In Figure 5 the abridged type is shown. There the base circles $C_1$ and $C_2$ touch each other internally, resulting in the fact that the spirals of the gear are abridged involutes, and approach the tangent plane in the same direction as do the spirals of the worm. The pitch cone apex A of the worm is at a distance $(a-p)$ from the gear apex J. The distance $(a-p)$ also equals the inside radius of the teeth of the gear H. As in the previous example, also here the common normals $E_1$ F; $E_2$ F, etc. all pass through the point of tangency F of the two base circles.

Referring now again to the Figures 2 and 3 and keeping in mind the above disclosed kinematical laws governing the correct engagement of spiral bevel gearing of the modified involute type, we are now in position to calculate the proper tooth curves for the hyperboloidal wheel G. If we denote the coordinates of the point Q (Fig. 2) with $x_0, y_0$ and $z_0$, those coordinates may be determined from the equation (2) as follows:

$$x_0 = r \cos \delta$$
$$y_0 = c \cos^2 \delta \qquad (7)$$
$$z_0 = \sin \delta \sqrt{r^2 - c^2 \sin^2 \delta}$$

The mathematical theory of the new hyperboloidal gearing is rather intricate on account of the complex kinematical relationships existing between the two conjugate tooth surfaces of this kind. I have, however, devised a practicable method of calculating such gearing and also of accurately determining the characteristic angles and distances to which the spindles of the hobbing machine must be set to generate such gearing. In order to accomplish this, I usually first start from the plane development of the curves in the neighborhood of the point Q (developed upon the common tangent plane Q A J).

Figure 6:
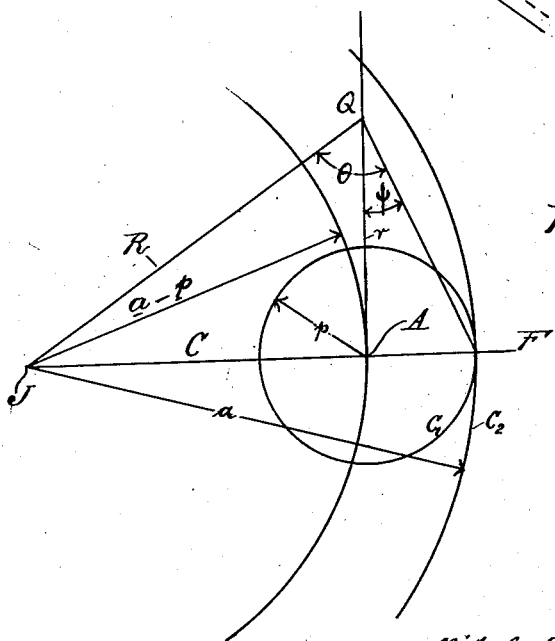

In designing a pair of such gears, the cone angle of the worm, the type of contact (extended or abridged), the numbers of teeth in the worm and gear, and the angle A Q J $= \theta$ are first selected. It should be noted that in any case the worm E is so positioned that it lies wholly on one side of the line AJ which is perpendicular to the axes of both gear and worm. Suppose now that the abridged type is adopted (which type is suitable for the final drives of automobiles and trucks), then Figure 6 represents the tangent plane Q A J. If the angle $\theta$ be assumed (in the drive illustrated in Figures 2 and 3 $\theta = 45$ deg.), and the cone angle of the worm is equal to $\delta$ (in our case 30 deg.), the cone angle $\gamma$ of the inner cone H may be determined from the following relation:

$$\tan \gamma \tan \delta = \cos \theta \qquad (8)$$

Now, the numbers of teeth in the worm and the gear, $n_1$ and $n_2$, are known as well as the diametral pitch P of the rack element $g$. Then, the two base radii, $p$ and $a$ are easily determined, viz:

$$p = \frac{n_1}{2P \sin \delta} \qquad (9)$$

$$a = \frac{n_2}{2P \sin \gamma} \qquad (10)$$

In the abridged type the apex distance $C = A J = a - p$, while the same distance in the extended type equals $a + p$. Thus, C is known from the preceding equations in either case. The pitch cone radii $r$ and R may also be determined from the right triangle Q A J, Figure 6, as follows:—

$$r = \frac{C}{\tan \theta} \qquad (11)$$

$$R = \frac{C}{\sin \theta} \qquad (12)$$

The shortest distance $c$ between the axes of the worm and gear may be determined from the equation.

$$c = C \frac{\sin \gamma}{\cos \delta} \qquad (13)$$

Figure 7:
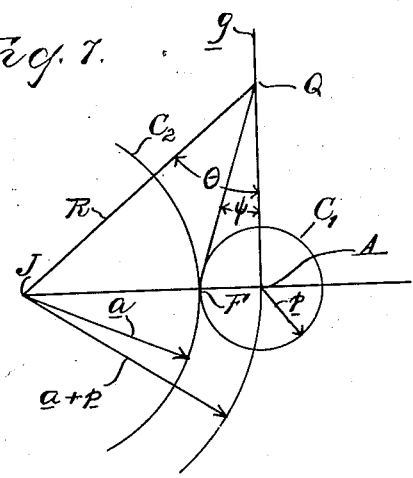

Figure 7 shows a diagram analogous to Figure 6, representing the conditions existing in the extended type of such gearing, which diagram in view of the complete analogy needs no further explanation.

*Method of manufacturing worm and gear.*

Having thus mathematically formulated the relations controlling the correct engagement of the new hyperboloidal gearing, we may now proceed to devise a suitable method of cutting, and also the necessary apparatus for manufacturing such gears.

Figure 8:
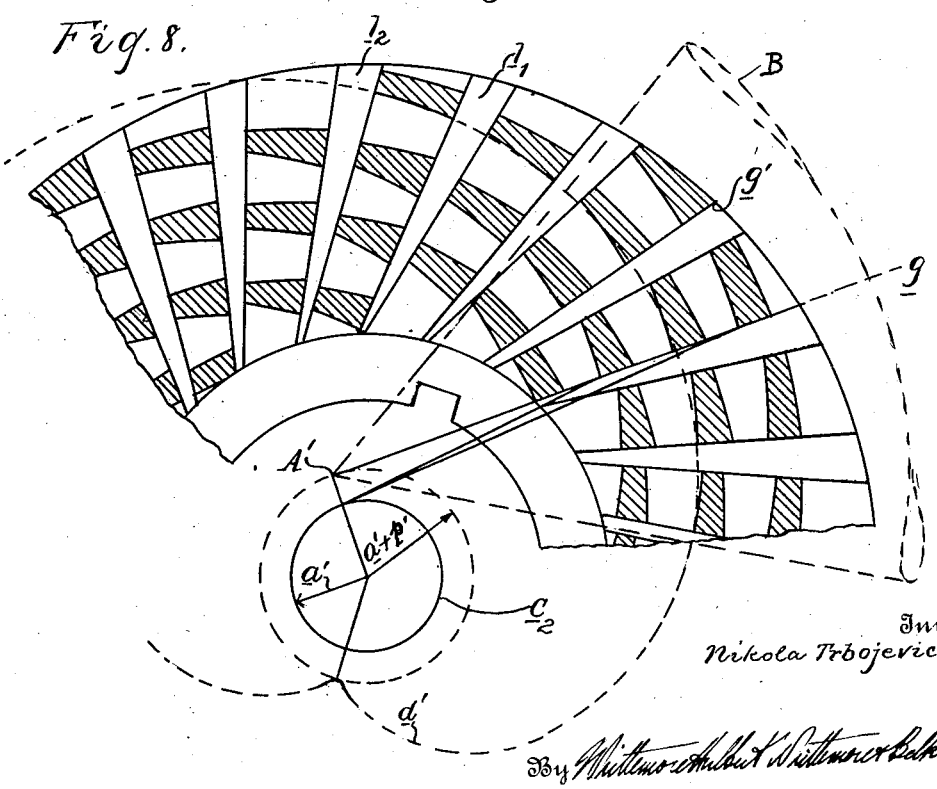
Figure 8 shows a portion of a hob of the crown wheel type, for hobbing the tapered worms.

The tapered worm and the hyperboloidal gear are essentially two different articles, and each is manufactured in a different fashion from the other. A tapered worm of constant lead may be milled in the well known universal milling machine, and its threads can also be ground all over after hardening in a similar operation. It is also possible to manufacture such worms by the hobbing process, by means of a tapered hob as described in my method, Patent No. 1,465,150, and in a hobbing machine described in my copending application for patent, Serial Number 637,372, filed May 7, 1923. There is still another way of hobbing such worms, and that is by means of a hob of the crown wheel type. In my method patent above mentioned I have shown that a crown wheel of the modified involute type may be hobbed by a tapered hob of the Archimedean spiral type. Evidently, the process is reversible, and if a hob of a form of a modified involute crown gear type is constructed and provided with suitable teeth by gashing the threads crosswise, said hob may be employed for the manufacture of tapered screws of constant pitch. In that case, the tapered conical blank is correctly superposed upon said crown hob, so that its apex coincides with A', Fig. 8, then both are rotated in a timed relation, and a relative movement of feed or translation is imparted to the blank in a direction perpendicular to the cutting plane of the hob. A portion of a hob of that type is shown in Fig. 8. In that example the threads are first milled along the extended involutes $d'$ in such a manner that the sections of the threads are the rack elements $g$, all tangent to the $(a'+p)$ circle, where $a'$ is the base radius of the hob and $p$ the polar subnormal of the Archimedean spiral which it is desired to generate. The teeth are gashed crosswise by a number of equi-spaced flutes $l_1$ $l_2$ etc., which flutes are preferably straight and coincide with the rack elements $g$, although circular or otherwise curved flutes may also be employed under certain conditions.

Figure 9:
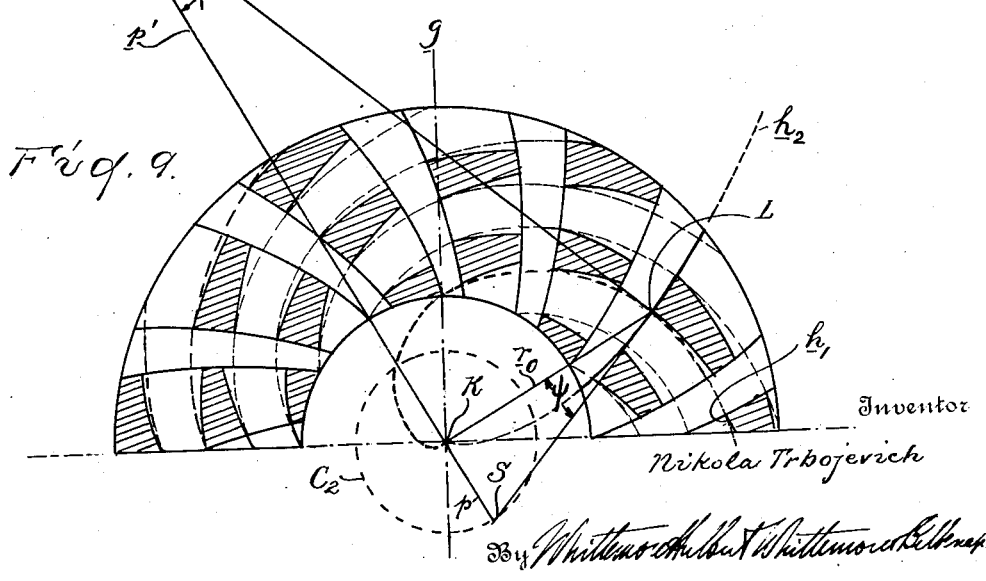
Figure 9 shows the pitch cone development of a tapered hob of constant pitch having spiral flutes, for hobbing the worm gears.

The manufacture of the spiral hyperboloidal gears such as G in Figures 2 and 3 is best accomplished by hobbing. The hob is an exact counterpart of the tapered worm E and is provided with a number of straight or spiral flutes, and the remaining portions of the thread are relieved in a direction perpendicular to the side of the cone as shown in my Patent #1,465,151. If the angle $\psi$ (Figs. 6 and 7) of the hob thread is considerable (greater than 8 or 10 degrees) such hobs may be provided with spiral flutes, similar to those employed in common spur hobs. Fig. 9 shows the pitch cone development of a tapered hob of constant pitch having spiral flutes. The rack elements $g$ all converge in the apex K as in the straight fluted hobs and the cutting edges are lined up along the Archimedean spiral segments $h_1$. The flutes are also Archimedean spirals $(h_2)$ preferably so arranged that they are perpendicular to the thread spirals at the point L, said point lying substantially in the middle of the face of the hob. The polar subnormal of the flutes $p' = $ K M may be calculated from the S L M triangle, said value being:

$$p' = \frac{\gamma_0^2}{p} \quad (14)$$

where $\gamma_0$ is equal to the distance K L.

The hobbing of the new hyperboloidal gears is easily accomplished by taking into consideration the fact that the new gear bears the same relation with respect to the spiral bevel gear of the modified involute type as does the common worm gear to a spur helical gear, that is, the hyperboloidal gear is nothing but a worm gear modification of the conical gear. This theory of hyperboloidal gearing, to my knowledge, is new in the art and goes to explain the curious fact that although the existence of hyperboloidal or skew bevel gearing has been long known in the art, yet no one has succeeded before in devising a correct form of teeth for such gearing.

Figure 10:
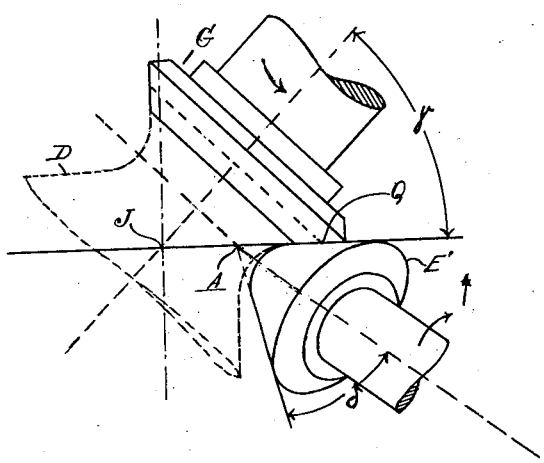
Figures 10 and 11 are two diagrammatic views of the drive shown in Figures 2 and 3, projected upon the common tangent plane.
Figure 11:
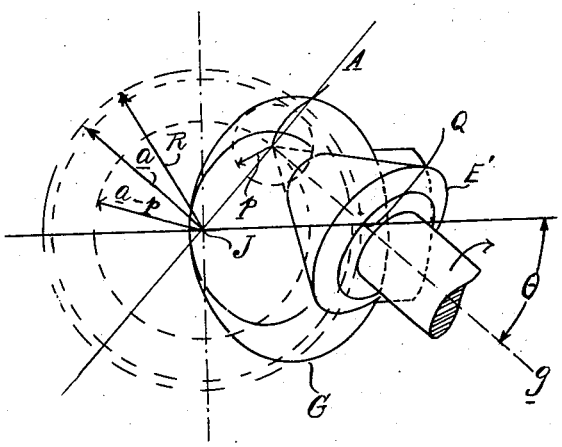

Thus, the method of hobbing hyperboloidal gears of the new type consists of the following steps: First the diameter and the cone angle of the blank are determined by calculation as explained in previous paragraphs, by taking into account the desired number of teeth the pitch, the angle of helix, etc. Then, the pitch cone H of the blank is placed in a tangent relation with respect to the common tangent plane Q A J (Figs. 10 and 11) along the line JA, while the pitch cone of the hob E' is tangent to said plane on its opposite side along the line AQ. The pitch cone apexes of the blank and the hob are at J and A respectively, and the distance $JA = a-p$ (for the abridged type). When this alinement is being accomplished the angle JQA must always be exactly equal to the angle $\theta$, which value was used in calculating the cone angle $\gamma$ and the base radius $a$. Second, the blank and the hob are rotated in a timed relation, the ratio of rotation being inversely proportional to the corresponding numbers of teeth or threads. The direction of rotation is the same both for the hob and blank if extended type is generated, and opposite (as shown by the arrows in Figs. 10 and 11) if the abridged type is cut. Third, the hob is given a relative feed movement in a direction substantially perpendicular to the common tangent plane, and fed into the blank until the proper depth of teeth is reached. In that manner all teeth of the gear G are finished in one continuous cut on their both sides, and along their entire lengths.

Such gears are preferably generated in the same machine that is used for hobbing of spiral bevel gears and which is fully described in my pending application, Serial No. 637,372, filed May 7, 1923. The only difference in the method of generation as compared with the generation of spiral bevel gears is that in this case the circular feed of the hob about the apex of the hob is disconnected, and the hob (after the rotary feed table has been set and fixed in exact angular position with respect to the axis of blank) is fed slowly by hand or power in a direction perpendicular to the common tangent plane. It will be seen, therefore, that the process of generation of a hyperboloidal gear is similar to the generation of a crown gear, and is also analogous to the cutting of the common worm gear of the spur gear system.

In Figure 12 a diagrammatic plan view of a machine of this type is shown. Said view is the same as the one shown in my above mentioned pending application except that here the gear trains serving to rotate the feed cylinder in a timed relation with the gear and hob spindles, are omitted as unnecessary in this operation.

The hob 21, which in this case has a cone angle of 30 deg. is mounted upon the hob spindle 22 intersecting the common tangent plane 23$^a$ at an angle of 30 deg. which results in the fact that the side of the hob facing the gear blank is always parallel to said tangent plane. The hob spindle 22 is rotatably mounted in the cutter head 23 which latter is longitudinally slidable in the ways formed in the top of the cutter base 24. Said base is pivotable on the accurately finished side of the large cylindrical casting or spindle 25 about the center of the shaft 26 from which the hob is driven. Thus, the hob is adjustable both angularly with respect to the axis of the spindle 25 and also longitudinally, so that its apex may be brought into any required exact distance from the gear apex, as required by the theory.

The large spindle 25 is rotatable in the main frame of the machine for the purpose of adjusting for the angle $\theta$, as previously explained. Said adjustment is accomplished by rotating the hand wheel 28 acting upon the large worm gear 29 through the worm shaft 30. The worm gear 29 is connected to the cylinder 25 by means of three screws 31, the action of which will be explained presently.

The hob is driven from the pulley 32 through a pair of speed change gears 33, a pair of miter gears 34, the splined shaft 35, three spur gears 36, 37 and 38, the shaft 26 and the pair of bevel gears 27. The gear blank 39 is mounted in the work head 40 which latter is longitudinally adjustable in the horizontal ways of the work base 41 and also angularly adjustable with respect to the top of the large semi-circular table 42 having a center in line with the axis of the cylinder 25. Thus the blank may be properly adjusted with respect to the tangent plane 23 as required. The blank is rotated from the pulley through a pair of miters 43, the auxiliary shaft 44 running at an angle of about 45 deg. relative to the central plane of the machine, a pair of bevel gears 45, the long horizontal shaft 46, a pair of miters 47, the cross shaft 48, the miters 49, the index change gears 50, and the pinion and gear 51 and 52, mounted in the work head.

The feeding of the hob into the gear blank is accomplished either by hand or by power. In the former case, the hand wheel 53 acts upon a pair of bevel gears 54 mounted concentric with the drive shaft 35 upon a sleeve 55 to which sleeve also the spur gear 56 is keyed. Said spur gear 56 engages three outer spur gears 57 each of which is keyed to one of the screws 31, housed in three suitable bearings 58 integral with the worm gear 29. The three screws 31 are fitted into suitable bosses integral with the cylinder 25. The worm gear 25 is immovable during the process of generation as the worm 30 locks it and prevents it from rotating while the thrust bearings 58 maintain it in a fixed position in a vertical plane. Thus, when the three feed screws 31 are rotated, the cylinder 25 carrying with it the hob, slowly advances in a direction perpendicular to the tangent plane 23$^a$.

From this the operation of the machine will be understood. It is also obvious that hobbing machines of much simpler construction than the one shown may be designed, especially when such wide range of adjustment as is obtainable with the above construction is not insisted upon. In that case (for single purpose manufacturing) comparatively simple fixtures may be designed to fit any standard milling or spur hobbing machine, and correct hyperboloidal gears may thus be hobbed, economically and accurately.

What I claim as my invention is:

1. A gear having spiral teeth such as might be generated in a blank by a tapered worm of the modified involute type when the axes of said worm and blank are arranged to be non-intersecting and non-parallel and are maintained in fixed relation while said blank and gear are respectively rotated thereabout in timed relation.

2. A gear having spiral teeth such as might be generated upon a blank by a tapered worm of the modified involute type when the axis of said worm is placed at a fixed distance from the axis of the blank and at right angles thereto and when the two elements are rotated in a timed relation.

3. A gear such as might be generated upon a blank by a tapered worm the threads of which are capable of meshing crosswise with a straight rack element of constant pitch, when the axis of said worm is arranged at a fixed distance from the axis of the blank and at right angles thereto, and when the two elements are rotated in a timed relation.

4. A gear such as might be generated upon a blank by a tapered screw the axial sections of which are straight rack elements of constant pitch, when the axis of said crew is arranged at a fixed distance from the axis of the blank and at right angles thereto, and when the two elements are rotated in a timed relation.

5. A hyperboloidal gear having spiral teeth of the modified involute type.

6. A hyperboloidal gear having spiral teeth, the longitudinal tooth curves of which in a tangent cone development are modified involutes of a circle, while the transverse tooth contours are capable of correctly meshing with a straight rack element of constant pitch.

7. A hyperboloidal gear such as might be generated upon a blank by a tapered screw of constant pitch, when the axis of said screw is arranged at a fixed distance from the axis of the blank and at right angles thereto, when the pitch cone apex of the screw lies on the focal circle of the generated pitch cone hyperboloid and when both elements are rotated in a timed relation.

8. A hyperboloidal gear having spiral teeth, the longitudinal tooth curves of which in tangent cone development are abridged involutes of a circle, while the transverse contours are conjugate to a rack element of constant pitch.

9. A pair of mating gears arranged with their axes non-intersecting and non-parallel, consisting of a tapered worm and a spiral hyperboloidal gear.

10. A pair of mating gears arranged with their axes non-intersecting and non-parallel, consisting of a tapered screw of constant pitch, and a conjugate hyperboloidal gear of the modified involute type.

11. A pair of mating gears arranged with their axes non-intersecting and at right angles, consisting of a tapered worm and a spiral hyperboloidal gear, both of the modified involute type.

12. A pair of mating gears arranged with their axes non-intersecting and at right angles, consisting of a tapered screw of constant pitch and a conjugate hyperboloidal gear of the modified involute type.

13. A pair of mating gears arranged with their axes non-intersecting and non-parallel, consisting of a tapered worm of constant pitch having a predetermined polar subnormal, and a hyperboloidal gear having longitudinal tooth curves which in their tangent cone development are modified involutes having a modification equal in absolute value to the polar subnormal of the worm.

14. A pair of mating gears arranged with their axes non-intersecting and at right angles, consisting of a tapered worm of constant pitch having a predetermined polar subnormal and a hyperboloidal gear having longitudinal tooth curves which in their tangent cone development are modified involutes having a modification equal in absolute value to the polar subnormal of the worm.

15. A pair of mating gears having helical threads of opposite hands, in which the driving member is a tapered screw of constant pitch, and the driven member is a hyperboloidal gear, the longitudinal tooth curves of which in tangent cone development are abridged involutes of circle, while the transverse contours are conjugate to a rack element of constant pitch.

16. A worm drive in which the driving member is a tapered worm of constant pitch and the driven member is a hyperboloidal gear, the longitudinal tooth curves of which in tangent cone development are abridged involutes of a circle.

17. A hyperboloidal gear having spiral teeth and capable of meshing with a tapered screw of constant lead.

18. A hyperboloidal gear having spiral teeth and capable of correctly meshing with a rack element of constant pitch at all points when said element is placed across the spiral teeth.

19. A worm drive consisting of a worm and a worm gear having spiral teeth, arranged with their axes non-intersecting and at right angles, and meshing with a sliding contact; in which the hand of spiral teeth is right hand for one, and left hand for the other member.

20. A pair of tapered gears, each of which is provided with longitudinally curved teeth, arranged with offset angularly disposed axes and meshing with line contact, said gears being so positioned relatively to each other that the smaller member of the pair lies wholly on one side of a line drawn perpendicular to the axes of the two gears.

21. A pair of gears arranged with offset angularly disposed axes and meshing with line contact, consisting of a worm and a curved tooth gear having teeth formed on its side face, and extending from the inside to the outside edges thereof, said gears being so positioned relatively to each other that the worm lies wholly on one side of a line drawn perpendicular to the axes of the two gears so that the peripheral movements of the two gears are at an oblique angle to each other.

22. A pair of gears arranged with offset angularly disposed axes and meshing with line contact, consisting of a taper worm and a tapered curved tooth gear having teeth formed on its side face, said gears being so positioned relatively to each other that the worm lies wholly on one side of a line drawn perpendicular to the axes of the two gears.

23. A pair of gears arranged with offset angularly disposed axes and meshing with line contact, consisting of a worm of constant pitch and a curved tooth tapered gear having teeth formed on its side face, said gears being so positioned relatively to each other that the worm lies wholly on one side of a line drawn perpendicular to the axes of the two gears.

24. A pair of gears arranged with offset angularly disposed axes and meshing with line contact, consisting of a taper worm of constant pitch and a tapered curved tooth gear having teeth formed on its side face, said gears being so positioned relatively to each other that the worm lies wholly on one side of a line drawn perpendicular to the axes of the two gears.

25. A pair of tapered gears, each of which is provided with longitudinally curved teeth, arranged with angularly disposed axes and with the axis of one gear offset from the axis of the mate gear, in a plane tangent to their respective pitch surfaces, a distance no greater than the inside radius of the teeth of the mate gear, said gears being adapted to mesh with line contact.

26. A pair of gears, each of which is provided with longitudinally curved teeth and one of which is conical, arranged with angularly disposed axes and with the axis of one gear offset from the axis of the mate gear, in a plane tangent to their respective pitch surfaces, a distance no greater than the inside radius of the teeth of the mate gear, said gears being adapted to mesh with line contact and the spiral angle of the teeth of the smaller gear being larger than the spiral angle of the teeth of the larger gear.

27. A pair of conjugate gears, each of which is provided with longitudinally curved teeth and one of which is conical, arranged with angularly disposed offset axes and adapted to mesh with line contact, the spiral angle of the teeth of the smaller gear being larger than the spiral angle of the teeth of the larger gear.

28. A pair of conjugate longitudinally curved tooth gears arranged with angularly disposed offset axes and adapted to mesh with line contact, one of which is a conical worm.

29. A pair of longitudinally curved tooth gears arranged with angularly disposed offset axes and adapted to mesh with line contact, one of which is a taper worm of constant pitch and the other of which is a tapered gear having longitudinally curved teeth on its side face.

30. A pair of gears meshing with line contact, consisting of a worm and a mating longitudinally curved tooth gear having teeth formed on its side face, said gears being arranged with angularly disposed offset axes and with the axis of the worm offset from the axis of the mate gear, in a plane tangent to their respective pitch surfaces, a distance no greater than the inside radius of the teeth of the mate gear.

31. A pair of gears meshing with line contact, consisting of a worm of constant pitch and a mating longitudinally curved tooth gear having teeth formed on its side face, said gears being arranged with angularly disposed offset axes and with the axis of the worm offset from the axis of the mate gear, in a plane tangent to their respective pitch surfaces, a distance no greater than the inside radius of the teeth of the mate gear.

32. A pair of gears meshing with line contact, consisting of a tapered worm and a mating longitudinally curved tooth tapered gear, said gears being arranged with angularly disposed axes and with the axis of the worm offset from the axis of the mate gear, in a plane tangent to their respective pitch surfaces, a distance no greater than the inside radius of the teeth of the mate gear.

33. A pair of gears meshing with line contact, consisting of a taper worm of constant pitch and a mating longitudinally curved tooth tapered gear, said gears being arranged with angularly disposed axes and with the axis of the worm offset from the axis of the mate gear, in a plane tangent to their respective pitch surfaces, a distance no greater than the inside radius of the teeth of the mate gear.

34. A gear having longitudinally curved teeth such as might be generated in a tapered gear blank by a worm when so positioned that its axis is angularly disposed with reference to and offset from the axis of the blank and that it lies wholly on one side of a line drawn perpendicular to its axis and the axis of the blank, and is so maintained while the two elements are rotated in timed relation.

35. A gear having longitudinally curved teeth such as might be produced in a tapered blank by a taper worm of constant pitch when the axis of the worm is angularly disposed with reference to and offset from the axis of the blank and is maintained at a fixed distance from the axis of the blank while the two elements are rotated in timed relation.

36. A gear having longitudinally curved teeth such as might be produced in a tapered blank by a conical worm when the axis of the worm is angularly disposed with reference to and offset from the axis of the blank and is maintained at a fixed distance from the axis of the blank while the two elements are rotated in timed relation.

In testimony whereof I affix my signature.

NIKOLA TRBOJEVICH.